(12) United States Patent
Mizrahi

(10) Patent No.: US 11,036,807 B2
(45) Date of Patent: Jun. 15, 2021

(54) METADATA GENERATION AT THE STORAGE EDGE

(71) Applicant: Marvell World Trade Ltd., St. Michael (BB)

(72) Inventor: Noam Mizrahi, Modi'in (IL)

(73) Assignee: MARVELL ASIA PTE LTD, Singapore (SG)

( * ) Notice: Subject to any disclaimer, the term of this patent is extended or adjusted under 35 U.S.C. 154(b) by 201 days.

(21) Appl. No.: 16/262,975

(22) Filed: Jan. 31, 2019

(65) Prior Publication Data

US 2020/0042549 A1 Feb. 6, 2020

Related U.S. Application Data

(60) Provisional application No. 62/712,823, filed on Jul. 31, 2018, provisional application No. 62/714,563, (Continued)

(51) Int. Cl.
*G06F 16/907* (2019.01)
*G06F 16/901* (2019.01)
(Continued)

(52) U.S. Cl.
CPC .......... *G06F 16/907* (2019.01); *G06F 3/0604* (2013.01); *G06F 3/068* (2013.01); *G06F 3/0638* (2013.01); *G06F 3/0659* (2013.01); *G06F 3/0688* (2013.01); *G06F 12/1054* (2013.01); *G06F 15/17331* (2013.01); *G06F 16/383* (2019.01); *G06F 16/387* (2019.01);
(Continued)

(58) Field of Classification Search
CPC . H04L 69/162; H04L 67/1095; G06F 3/0688; G06F 16/957; G06F 40/258; G06F 16/9027; G06F 16/954; G06F 16/148; G06F 16/907; H04N 21/443; H04N 21/278

See application file for complete search history.

(56) References Cited

U.S. PATENT DOCUMENTS 6,012,068 A 1/2000 Boezeman
6,215,749 B1 4/2001 Kim
(Continued)

FOREIGN PATENT DOCUMENTS

EP 3244347 A1 11/2017

OTHER PUBLICATIONS

International Application # PCT/IB2019/050776 search report dated Mar. 26, 2019.
(Continued)

*Primary Examiner* — Etienne P Leroux

(57) ABSTRACT

A controller, for use in a storage device of a data processing system, includes a host interface, a memory interface and one or more processors. The host interface is configured to communicate over a computer network with one or more remote hosts of a data processing system. The memory interface is configured to communicate locally with a non-volatile memory of the storage device. The one or more processors are configured to manage local storage or retrieval of media objects at the non-volatile memory, and to selectively compute metadata that defines content characteristics of media objects that are stored, or that are to be stored, in the non-volatile memory.

28 Claims, 4 Drawing Sheets

Related U.S. Application Data filed on Aug. 3, 2018, provisional application No. 62/716,269, filed on Aug. 8, 2018, provisional application No. 62/726,847, filed on Sep. 4, 2018, provisional application No. 62/726,852, filed on Sep. 4, 2018.

(51) Int. Cl.

| | | |
|---|---|---|
| *G06F 16/9038* | (2019.01) | |
| *G06F 16/9035* | (2019.01) | |
| *G06F 16/783* | (2019.01) | |
| *G06F 16/387* | (2019.01) | |
| *G06F 16/683* | (2019.01) | |
| *G06F 16/383* | (2019.01) | |
| *G06F 3/06* | (2006.01) | |
| *G06N 3/08* | (2006.01) | |
| *G06F 12/1045* | (2016.01) | |
| *G06F 15/173* | (2006.01) | |
| *H04L 12/879* | (2013.01) | |
| *H04L 29/08* | (2006.01) | |

(52) U.S. Cl.
CPC .......... *G06F 16/683* (2019.01); *G06F 16/783* (2019.01); *G06F 16/901* (2019.01); *G06F 16/9035* (2019.01); *G06F 16/9038* (2019.01); *G06N 3/08* (2013.01); *H04L 49/901* (2013.01); *H04L 67/1097* (2013.01); *G06F 2212/254* (2013.01)

(56) References Cited

U.S. PATENT DOCUMENTS

| | | | |
|---|---|---|---|
| 8,938,492 B1 | 1/2015 | Kelly | |
| 9,451,329 B2* | 9/2016 | Whitman | H04N 21/278 |
| 9,639,969 B1 | 5/2017 | Wilson et al. | |
| 9,966,112 B1 | 5/2018 | Kulkarni et al. | |
| 10,129,109 B2 | 11/2018 | Jayanti Venkata et al. | |
| 2004/0143590 A1 | 7/2004 | Wong et al. | |
| 2005/0055406 A1* | 3/2005 | Singhai et al. | H04L 69/162 709/206 |
| 2006/0047706 A1 | 3/2006 | Castro et al. | |
| 2006/0274949 A1 | 12/2006 | Gallagher et al. | |
| 2007/0038647 A1* | 2/2007 | Thomas | H04N 21/443 |
| 2007/0156726 A1 | 7/2007 | Levy | |
| 2008/0195664 A1 | 8/2008 | Maharajh et al. | |
| 2009/0132462 A1 | 5/2009 | Szabo | |
| 2009/0216719 A1* | 8/2009 | Coffman | G06F 16/957 |
| 2011/0235858 A1 | 9/2011 | Hanson et al. | |
| 2012/0265735 A1 | 10/2012 | McMillan et al. | |
| 2012/0278560 A1 | 11/2012 | Benzion et al. | |
| 2012/0278705 A1* | 11/2012 | Yang | G06F 40/258 715/254 |
| 2013/0289991 A1 | 10/2013 | Eshwar et al. | |
| 2013/0297652 A1* | 11/2013 | Higgins | G06F 16/148 707/770 |
| 2014/0074855 A1 | 3/2014 | Zhao et al. | |
| 2014/0122427 A1* | 5/2014 | Dary | G06F 16/27 707/620 |
| 2014/0250256 A1 | 9/2014 | Duran | |
| 2014/0270407 A1 | 9/2014 | Balakrishnan et al. | |
| 2015/0016691 A1 | 1/2015 | Anbalagan et al. | |
| 2015/0156263 A1* | 6/2015 | Clayton | G06F 16/954 709/217 |
| 2016/0036882 A1 | 2/2016 | Jin et al. | |
| 2016/0170871 A1 | 6/2016 | Hyun et al. | |
| 2016/0191591 A1 | 6/2016 | Rider et al. | |
| 2016/0335339 A1 | 11/2016 | Venkataraman et al. | |
| 2016/0378402 A1* | 12/2016 | Amidi | G06F 3/0688 711/103 |
| 2017/0094341 A1 | 3/2017 | Berner et al. | |
| 2017/0169358 A1 | 6/2017 | Choi et al. | |
| 2017/0185869 A1 | 6/2017 | Dua et al. | |
| 2017/0193362 A1 | 7/2017 | Cremer et al. | |
| 2017/0199886 A1 | 7/2017 | Perrine et al. | |
| 2017/0293431 A1 | 10/2017 | Dor et al. | |
| 2017/0304732 A1 | 10/2017 | Velic et al. | |
| 2017/0331893 A1* | 11/2017 | Crofton | H04L 67/1095 |
| 2018/0024770 A1 | 1/2018 | Lee | |
| 2018/0033208 A1 | 2/2018 | Martin | |
| 2018/0189615 A1 | 7/2018 | Kang et al. | |
| 2018/0307609 A1* | 10/2018 | Qiang | G06F 16/9027 |
| 2019/0138617 A1 | 5/2019 | Farre Guiu et al. | |
| 2020/0042888 A1 | 2/2020 | Yu et al. | |

OTHER PUBLICATIONS

Mizrahi et al., U.S. Appl. No. 16/262,971, filed Jan. 31, 2019.
Kudryavtsev et al., U.S. Appl. No. 16/263,387, filed Jan. 31, 2019.
Varnica et al., U.S. Appl. No. 16/264,248, filed Jan. 31, 2019.
Therene et al., U.S. Appl. No. 16/264,473, filed Jan. 31, 2019.
International Application # PCT/IB2019/056442 search report dated Dec. 12, 2019.
U.S. Appl. No. 16/262,971 Office Action dated Oct. 2, 2020.
IEEE Std 802.3ch-2020, "IEEE Standard for Ethernet, Amendment 8: Physical Layer Specifications and Management Parameters for 2.5 Gb/s, 5 Gb/s and 10 Gb/s Automotive Electrical Ethernet", pp. 1-207, Jun. 4, 2020.
IEEE Std 802.3bp-2016, "IEEE Standard for Ethernet, Amendment 4: Physical Layer Specifications and Management Parameters for 1 Gb/s Operation over a Single Twisted-Pair Copper Cable", pp. 1-211, Jun. 30, 2016.
IEEE Std 802.3bw-2015, "IEEE Standard for Ethernet, Amendment 1: Physical Layer Specifications and Management Parameters for 100 Mb/s Operation over a Single Balanced Twisted Pair Cable (100BASE-T1)", pp. 1-88, Oct. 26, 2015.
IEEE Std 802.3cg-2019, "IEEE Standard for Ethernet, Amendment 5: Physical Layers Specifications and Management Parameters for 10 Mb/s Operation and Associated Power Delivery over a Single Balanced Pair of Conductors", pp. 1-256, Nov. 7, 2019.
U.S. Appl. No. 16/264,248 Office Action dated Nov. 3, 2020.
U.S. Appl. No. 16/262,971 Office Action dated Feb. 16, 2021.
U.S. Appl. No. 16/264,248 Office Action dated Feb. 23, 2021.

\* cited by examiner

METADATA GENERATION AT THE STORAGE EDGE

CROSS-REFERENCE TO RELATED APPLICATIONS

This disclosure claims the benefit under 35 U.S.C. § 119(e) of commonly-assigned U.S. Provisional Patent Applications Nos. 62/712,823, filed Jul. 31, 2018; 62/714,563, filed Aug. 3, 2018; 62/716,269, filed Aug. 8, 2018; 62/726,847, filed Sep. 4, 2018; and 62/726,852, filed Sep. 4, 2018. Each of the following commonly-assigned United States non-provisional patent applications also claims the benefit of the aforementioned United States provisional patent applications, and is being filed concurrently herewith:

1. U.S. patent application Ser. No. 16/263,387, filed Jan. 31, 2019, entitled "SYSTEMS AND METHODS FOR GENERATING METADATA DESCRIBING UNSTRUCTURED DATA OBJECTS AT THE STORAGE EDGE";
2. U.S. patent application Ser. No. 16/264,473, filed Jan. 31, 2019, entitled "STORAGE EDGE CONTROLLER WITH A METADATA COMPUTATIONAL ENGINE";
3. U.S. patent application Ser. No. 16/264,248, filed Jan. 31, 2019, entitled "STORAGE AGGREGATOR CONTROLLER WITH METADATA COMPUTATION CONTROL"; and
4. U.S. patent application Ser. No. 16/262,971, filed Jan. 31, 2019, entitled "METADATA GENERATION FOR MULTIPLE OBJECT TYPES".

Each of the aforementioned provisional and non-provisional patent applications is hereby incorporated by reference herein in its respective entirety.

FIELD OF THE DISCLOSURE

The present disclosure relates generally to processing of media objects, and particularly to methods and systems for generation of metadata for media objects.

BACKGROUND

Various systems and applications involve analysis of large volumes of content, such as textual items, videos, images, voice files and sensor data, to name just a few examples. Some analysis tasks use metadata that is associated with the content.

The description above is presented as a general overview of related art in this field and should not be construed as an admission that any of the information it contains constitutes prior art against the present patent application.

SUMMARY

An embodiment that is described herein provides a controller for use in a storage device of a data processing system. The controller includes a host interface, a memory interface and one or more processors. The host interface is configured to communicate over a computer network with one or more remote hosts of a data processing system. The memory interface is configured to communicate locally with a non-volatile memory of the storage device. The one or more processors are configured to manage local storage or retrieval of media objects at the non-volatile memory, and to selectively compute metadata that defines content characteristics of media objects that are stored, or that are to be stored, in the non-volatile memory.

In some embodiments, the one or more processors are configured to generate the metadata for a plurality of unstructured media objects that that are stored, or that are to be stored, in the non-volatile memory. In some embodiments, the one or more processors are configured to receive from the one or more hosts, over the computer network, a model that specifies extraction of the metadata from the media objects, to generate the metadata based on the received model, and to store the generated metadata locally in the non-volatile memory, for use by the one or more hosts. In an example embodiment, the one or more processors are configured to receive, as the model, a pre-trained Artificial Intelligence (AI) model, and to generate the metadata by applying an AI inference engine to the AI model.

In another embodiment, the one or more processors are configured to assign a first priority to management of the storage or retrieval of the objects at the non-volatile memory, and to assign a second priority, lower than the first priority, to generation of the metadata. In yet another embodiment, the one or more processors are configured to generate the metadata during idle periods during which at least some resources of the one or more processors are free from managing storage of the objects. In a disclosed embodiment, the one or more processors are configured to identify the idle periods, to initiate or resume generation of the metadata during the identified idle periods, and to suspend the generation of the metadata outside the identified idle periods.

In some embodiments, the one or more processors are configured to make the metadata accessible to the one or more hosts, the one or more hosts being situated at a location that is remote from the processor, over the computer network. In an example embodiment, the one or more processors are configured to make the metadata accessible by transmitting the metadata, but less than all of the media objects from which the metadata was generated, over the computer network. In an embodiment, subsequently to sending the metadata, the one or more processors are configured to send one or more of the media objects over the computer network in response to a request from one or more of the hosts.

In some embodiments, the storage device includes a Solid State Drive (SSD), and the non-volatile memory includes one or more Flash memory devices. In other embodiments, the storage device includes a Hard Disk Drive (HDD), and the non-volatile memory includes one or more magnetic disks.

There is additionally provided, in accordance with an embodiment that is described herein, a method for generating metadata that defines content characteristics of media objects. The method includes, by a host interface coupled to a storage device situated in a data processing center, communicating over a computer network with one or more remote hosts of the data processing center, and by a memory interface of the storage device, communicating locally with a non-volatile memory of the storage device. Local storage or retrieval of media objects at the non-volatile memory is managed by one or more processors of storage device. Metadata, which defines content characteristics of media objects that are stored, or that are to be stored, in the non-volatile memory, is selectively computed by the one or more processors of the storage device.

There is also provided, in accordance with an embodiment that is described herein, a system including multiple storage devices and one or more hosts. Ones of the storage devices respectively includes a non-volatile memory and a controller. The controller is configured to manage local storage or retrieval of objects at the non-volatile memory, and to selectively compute metadata that defines content characteristics of media objects that are stored, or that are to be stored, in the non-volatile memory. The one or more hosts are configured to retrieve the metadata generated by the multiple storage devices, and to perform a data processing operation on the media objects using the retrieved metadata.

The present disclosure will be more fully understood from the following detailed description of the embodiments thereof, taken together with the drawings in which:

DETAILED DESCRIPTION OF EMBODIMENTS

Figure 1:
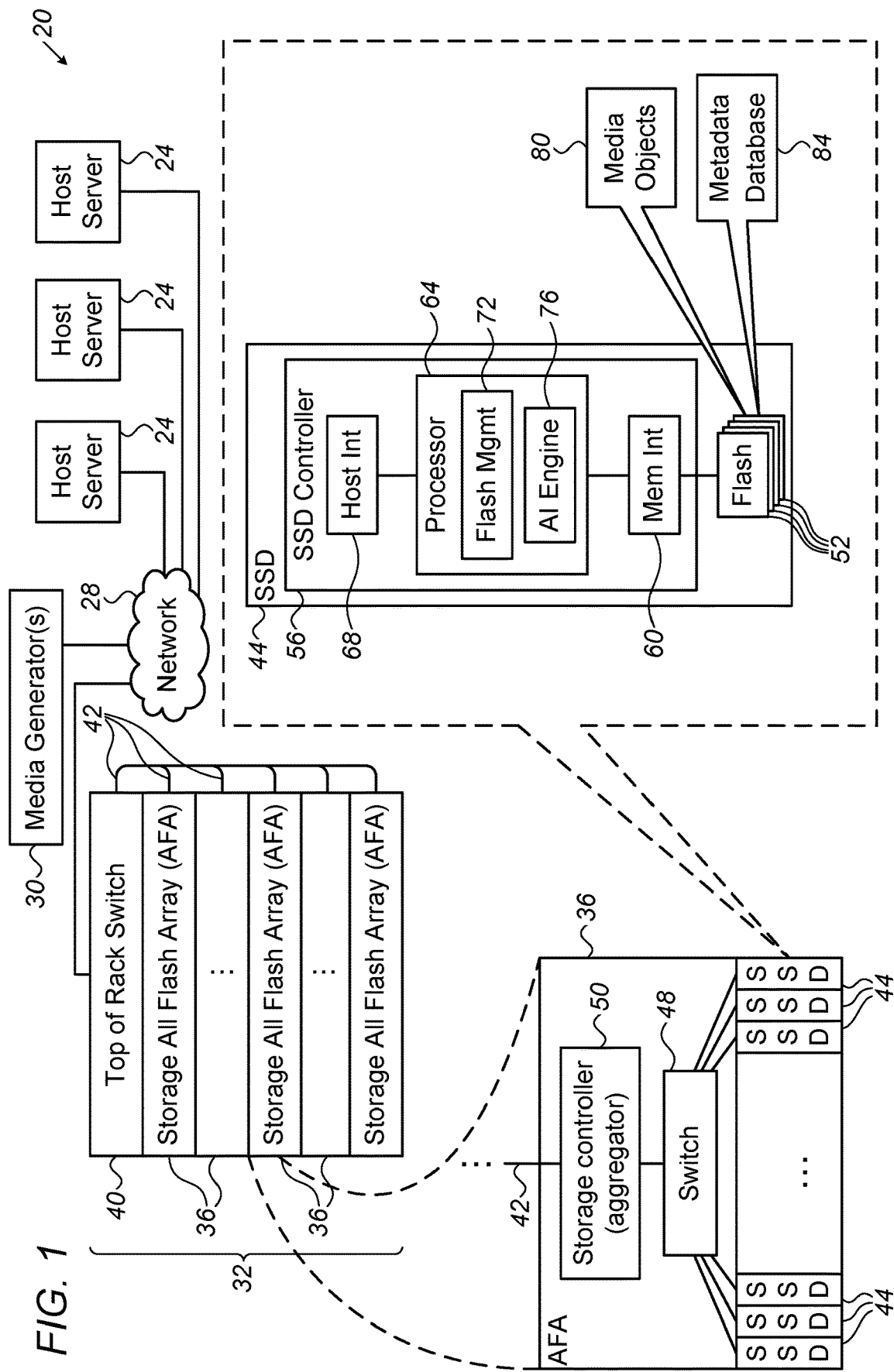
FIG. 1 is a block diagram that schematically illustrates a data center that performs metadata generation at the storage edge, in accordance with an embodiment that is described herein.

Embodiments that are described herein provide improved methods and systems for generating metadata for media objects, and for storing and using such metadata, in data processing systems.

In some embodiments, a data processing system is used for storing and analyzing a large volume of content data contained in media objects. Some non-limiting examples of object analysis applications include identification of persons of interest or other objects in video footage of security cameras, customized insertion of advertisements ("ads") into streamed videos, analytics of data from autonomous vehicles, analytics of call and response quality in a ChatBot Voice calls data base, text documents and/or text messages database analysis, mood detection, scene identification within a video file or Voice call, identification of persons or objects in surveillance footage, identification of types of actions occurring in surveillance footage, identification of voices or types of sounds in recordings, classification of phrases and/or responses used during conversation, analysis of automotive sensor data and driving responses, and many others.

Examples of media objects include videos, sound recordings, still images, textual objects such as text messages and e-mails, data obtained from various types of sensors such as automotive sensors and Internet-of-Things (IoT) sensors, database objects, and/or any other suitable objects. Media objects are also referred to herein simply as "objects" for brevity.

Typically, the system generates metadata for the media objects and performs the desired analysis, or executes an action, based on the metadata. In a system for ad insertion, for example, the system would typically analyze each streamed video, divide the video into scenes, estimate a sentiment associated with each scene, people and/or objects in the scene, identify the context of speech in the scene, and store the estimated scene-sentiments and other information as metadata associated with the video. Based on this metadata, the system can then choose where in the video to insert a given ad in order to maximize the ad's impact.

As another example in an entirely different field, a data processing system is used for off-line analysis of data acquired by cameras and other sensors of an autonomous car. In this example, the system may scan the video acquired by the car cameras and/or outputs of other car sensors, identify events that are pre-classified by the AI model as being of interest, and tag them as metadata. The system can then use the metadata to investigate the identified events.

In an example embodiment, in an automotive system, extremely large quantities of sensor data are generated. Metadata is generated on the storage side of a vehicle that is periodically connected to a network. The metadata is used to select portions of relevant sensor data to be at least temporarily stored at a storage device in the vehicle, or discarded. Metadata along with selected relevant objects are then periodically uploaded over a network connection to a central processor where the metadata objects are analyzed and can be applied for various purposes such as improving the behavior of autonomous vehicles, or determining targeted advertisements that are to be conveyed to users of the vehicle.

In many cases, the media objects are unstructured. In the present context, the term "unstructured object" means that the media content of the object (e.g., textual content, audio content, image content or video content) is provided is raw form and is not organized in advance according to a fixed field format. Typically, an unstructured object is not tagged a-priori with metadata that defines any aspects of the content per frame or other content portion. Typically, unstructured data is non-transactional, and its format does not readily conform to a relational database schema.

Metadata can be generated from media objects, which are almost always unstructured, in various ways. One possibility is to use an Artificial Intelligence (AI) model, e.g., a neural network. In a typical implementation, an AI model is trained using a "training set"—a body of media objects and corresponding metadata that is known to be accurate. The trained model is then applied to generate metadata for other media objects. A software or hardware module that receives a pre-trained AI model and uses it to compute metadata of objects is referred to herein as an "AI inference engine." In some implementations, several different AI models will be applied to unstructured or partially structured media objects.

The embodiments described herein dramatically improve the metadata generation process, by performing this task at the storage edge, close to the locations at which the objects are stored, rather than at one centralized location which conventionally requires the transport of a very large body of media object data through a network between storage and processing devices. In the present context, the term "at the storage edge" means at a processor or processors that are located on the storage-device side of the network, as opposed to the host-side of the network. In other words, a processor at the storage edge needs to send and/or receive information across the network in order to communicate with the hosts, but does not need to send and/or receive information across the network in order to communicate with the storage device. Non-limiting examples of storage-edge processors, as elaborated below, include Solid State Drive (SSD) controllers, processors is storage-array controllers (also referred to as aggregators), and processors in connected storage-edge appliances such as autonomous vehicles.

In a typical embodiment, the data processing system comprises one or more host servers ("hosts") that analyze media objects, and one or more storage devices (e.g., Solid State Drives—SSDs) in which the media objects are stored. The hosts and the storage devices communicate over a computer network. Each storage device comprises a Non-Volatile Memory (NVM) and a controller. Similarly, devices that aggregate storage among one or more storage devices also include a controller. These controllers are configured to both (i) manage local storage or retrieval of objects in the NVM, and (ii) selectively compute metadata that defines content characteristics of the media objects that are stored, or about to be stored, in the NVM, thereby leveraging controllers at the storage edge as a resource for computing metadata on unstructured or partially structured media objects.

In some embodiments, the controller of each storage device comprises its own local AI inference engine. The controller receives from the hosts a pre-trained AI model, compiles the AI model, and generates metadata for media objects by running the compiled AI model on the local AI inference engine.

In some embodiments, the controller of each storage device maintains a local metadata database, which holds the metadata generated for the media objects stored locally on that storage device. The local metadata databases of the various storage devices are accessible to the hosts over the computer network, for performing any desired object analysis task. In some embodiments, metadata is stored in association with, but separately from, the media objects such that metadata can be retrieved separately from the media objects. In some embodiments, storage of the media objects and their respective metadata is in the same storage device, but in other embodiments the metadata is stored in a separate storage device from the media objects, for instance at a remote location that is accessible over a computer network.

In some embodiments, the controller of a storage device gives higher priority to data storage and retrieval tasks, and lower priority to metadata generation. In example embodiments the controller identifies idle periods, in which at least some controller resources are free of data storage and retrieval tasks. The controller uses such idle periods to perform metadata generation. In this manner, the performance of the storage device is not degraded by the additional metadata generation task of the controller.

By delegating the metadata computation task from the hosts to the storage devices, the disclosed techniques eliminate the need to transport media objects across the network for the sake of computing the metadata. Typically, most if not all of the media objects remain within the boundaries of the storage devices, and it is the metadata that is provided to the hosts for analysis. Based on the metadata, the hosts are able to select which specific media object, or portions thereof, if at all, need to be retrieved over the network. As such, traffic overhead over the computer network is reduced considerably.

The disclosed techniques also reduce latency, e.g., because they require less data movement and since they enable distributed metadata generation in parallel by multiple storage-device controllers. Since the disclosed solution lends itself to distributed implementation across multiple storage devices, the solution is highly scalable. Since the disclosed technique improves metadata generation speed, it responds rapidly to updates of media objects.

FIG. 1 is a block diagram that schematically illustrates a data processing system 20, in the present example a data center, which performs metadata generation at the storage edge, in accordance with an embodiment that is described herein. System 20 is used for storing a large number of media objects, calculating metadata for the objects, and analyzing the objects based on the metadata, as explained above. In some embodiments system 20 receives, stores and analyzes objects of multiple different types.

In the embodiment of FIG. 1, data processing system 20 comprises one or more host servers 24 that communicate over a computer network 28. Host servers 24 are also referred to herein simply as "hosts" for brevity. Computer network 28 may comprise any suitable type of network, e.g., a Local Area Network (LAN), Wide Area Network (WAN), cloud network, data center network or the like. In an embodiment, system 20 comprises one or more media generators 30 that generate the media objects being stored and analyzed.

System 20 further comprises a remote storage rack 32, which is used by hosts 24 for storing objects, metadata and other relevant data. In some embodiments, storage rack 32 is part of a Storage Area Network (SAN) that communicates with network 28. Hosts 24 communicate with storage rack 32 over network 28 for storing and retrieving data.

In the example of FIG. 1, storage rack 32 comprises multiple storage units referred to as All-Flash Arrays (AFAs) 36. (In alternative embodiments, any other suitable type of storage units, and any other suitable type of storage devices, not necessarily Flash-based, can be used.) A Top-Of-Rack (TOR) switch 40 manages the communication between AFAs 36 and hosts 24 over network 28. In the present example, storage rack 32 including its various components is regarded as located "at the storage edge" of system 20.

An inset at the bottom-left of FIG. 1 shows the internal structure of AFA 36, in an embodiment. As seen, AFA 36 comprises multiple Solid State Drives (SSDs) 44 in which the data (e.g., objects and metadata) is stored. AFA 36 comprises a storage controller 50, which is configured to manage storage of data (e.g., media objects). Storage controller 50 is also referred to herein as an aggregation processor or aggregator. AFA 36 further comprises a switch 48 that is configured to communicate with TOR switch 40 over a suitable network cable 42.

In some embodiments, switch 48 communicates with SSDs 44 over a common Peripheral Component Interconnect Express (PCIe) bus, e.g., using the Non-Volatile Memory Express (NVMe) protocol. In other embodiments, hosts 24 communicate with SSDs 44 via switch 48 using Ethernet, e.g., using the NVMe-over-fabrics protocol. Further alternatively, other suitable protocols can be used. Communication between switch 48 and TOR switch 40 is typically conducted using Ethernet. In an embodiment, although not necessarily, AFA 36 comprises a Central Processor Unit (CPU) and/or Network Interface Controller (NIC), not shown in the figure, for communicating with TOR switch 40.

An inset at the bottom-right of the figure shows the internal structure of SSD 44, in accordance with an embodiment that is described herein. In the present embodiment, each SSD 44 comprises a plurality of Flash memory devices 52, e.g., NAND Flash memories, and an SSD controller 56. SSD controller 56 comprises a memory interface 60 for communicating with Flash devices 52, a host interface 68 for communicating with hosts 24 (via switch 48 and TOR switch 40), and a processor 64. Host interface 68 may communicate with hosts 24 using any suitable storage protocol, for example Non-Volatile Memory Express (NVMe) or Serial Advanced Technology Attachment (SATA).

As will be explained in detail below, processor 64 performs both storage/retrieval tasks and metadata computation tasks. Non-limiting examples of metadata computation tasks include identification, description and/or tagging of objects, activities, scene characteristics and other features of content within media objects. In yet other embodiments, metadata computation tasks are performed by storage controller (aggregator) 50.

In an embodiment, processor 64 comprises a Flash management module 72 and an Artificial Intelligence (AI) inference engine 76. Flash management module 72 is configured to store and retrieve data (e.g., objects and metadata) in Flash devices 52. The tasks of Flash management module 72 are also referred to as "Flash Translation Layer" (FTL). AI inference engine 76 is configured to compute metadata for media objects, as explained below. In an embodiment, SSD controller 56 stores in Flash devices 52 (i) media objects 80 and (ii) a metadata database 84 that holds the metadata of media objects 80.

Note that the SSD configuration of FIG. 1 is a non-limiting example configuration, and that any other suitable SSD controller can be used in alternative embodiments. For example, an alternative embodiment, in which the SSD controller comprises multiple Integrated Circuits (ICs) that communicate with one another via a suitable fabric, is described in FIG. 4 below.

Figure 2:
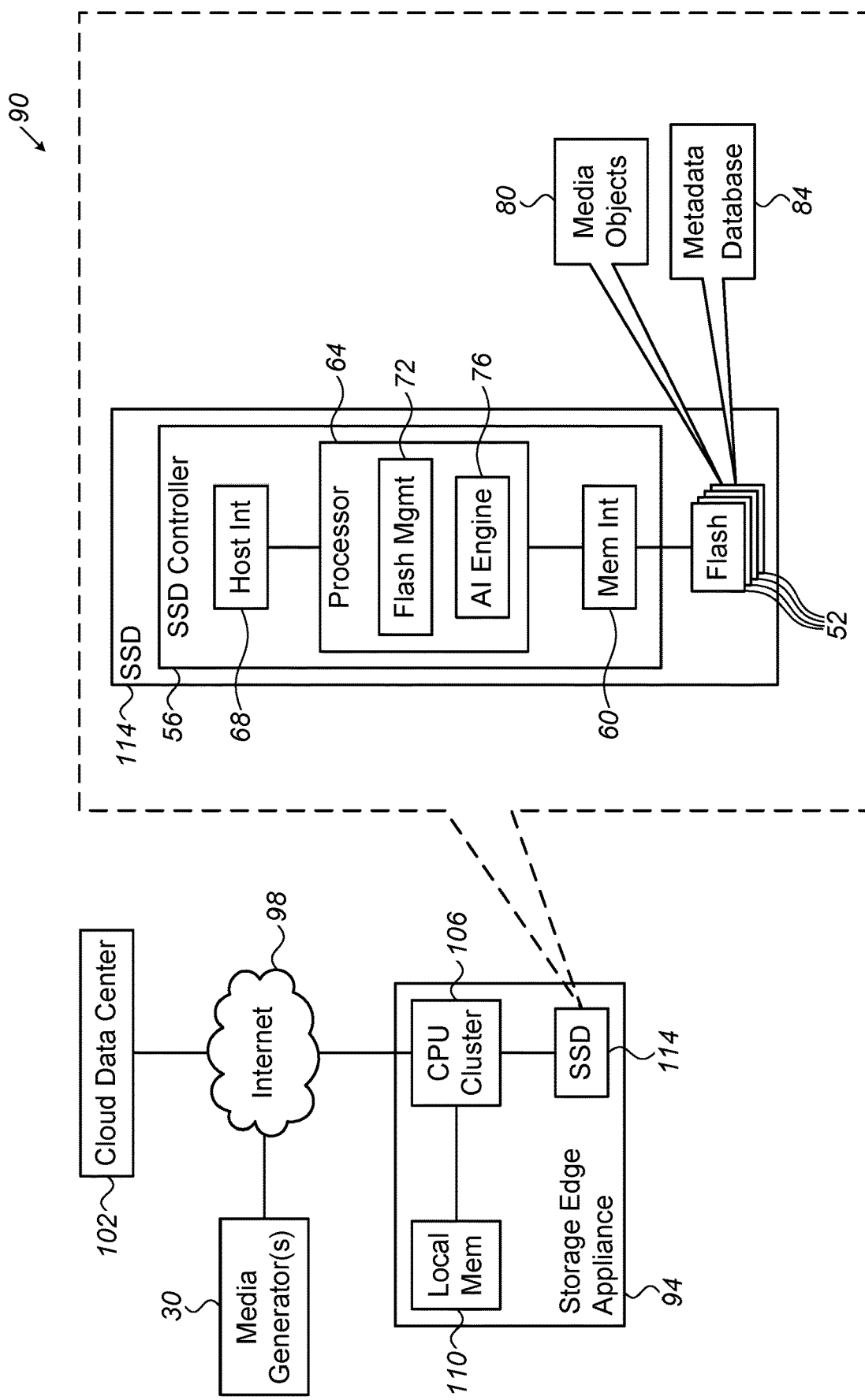
FIG. 2 is a block diagram that schematically illustrates an edge appliance that performs local metadata generation, in accordance with an embodiment that is described herein.

FIG. 2 is a block diagram that schematically illustrates a data processing system 90 in which an edge appliance 94 performs local metadata generation, in accordance with an embodiment that is described herein. Edge appliance 94 comprises, for example, an autonomous car, a surveillance box, an IoT device, or any other suitable type of edge device, in an embodiment.

In an embodiment, edge appliance 94 communicates with a cloud-based data center 102 via a computer network, in the present example the Internet. Data center 102 comprises one or more hosts (not shown). Edge appliance 94 comprises a Central Processing Unit (CPU) cluster 106, a local memory 110 (typically a Random Access Memory (RAM) or other volatile memory), and an SSD 114. The internal structure of SSD 114, in an embodiment, is shown in an inset on the right-hand side of the figure. The structure of SSD 114 is similar to that of SSD 44 of FIG. 1.

Figure 3:
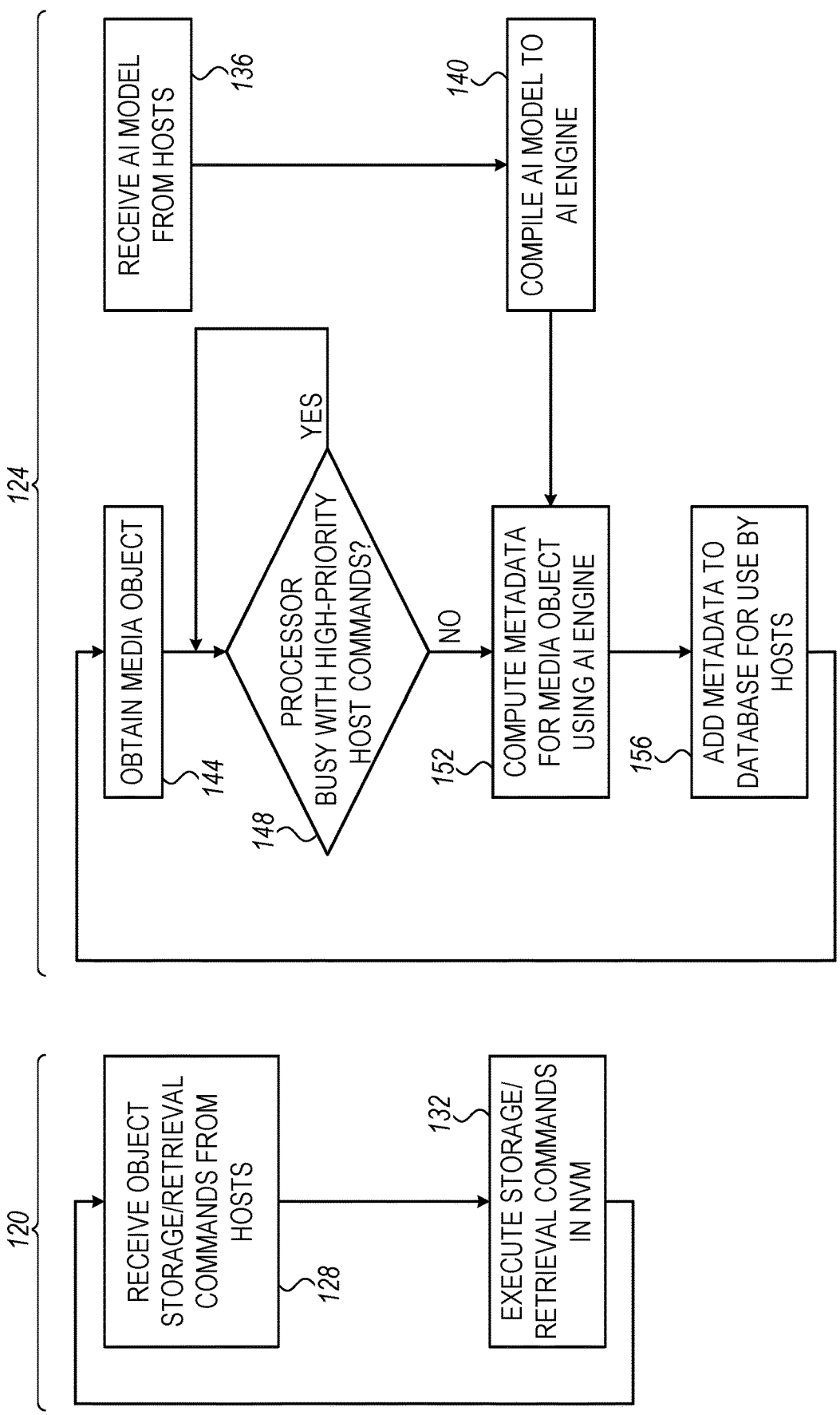
FIG. 3 is a flow chart that schematically illustrates a method for combined storage/retrieval and metadata generation in a Solid State Drive (SSD) controller, in accordance with an embodiment that is described herein.

FIG. 3 is a flow chart that schematically illustrates a method for combined storage/retrieval and metadata generation, carried out by SSD controller 56, in accordance with an embodiment that is described herein. A storage/retrieval process 120, carried out by Flash management module 72 in processor 64 of SSD controller 56, is depicted on the left-hand side of the figure. A metadata generation process 124, carried out by AI inference engine 76 in processor 64 of SSD controller 56, is depicted on the right-hand side.

The object storage/retrieval process begins with processor 64 receiving one or more storage/retrieval commands from hosts 24, via host interface 68, at a command reception operation 128. Storage/retrieval commands may comprise, for example, commands to read, write, modify or delete one or more media objects. At a command execution operation 132, Flash management module 72 executes the commands in Flash devices 52 via memory interface 60.

The metadata generation process begins with processor 64 receiving a pre-trained AI model from hosts 24, via host interface 68, at a model reception operation 136. At a compilation operation 140, processor 64 compiles the AI model and configures AI inference engine 76 with the compiled model.

At an object obtaining operation 144, AI inference engine selects a media object that is stored in Flash devices 52 (i.e., from among objects 80), or that is received over network 28 for storage in Flash devices 52. In other words, metadata can be generated both for media objects that are already stored in Flash devices 52 and for objects that are intercepted on-the-fly before they are stored in Flash devices 52.

At an idle period identification operation 148, processor 64 checks whether at least some resources of processor 64 are free of handling storage/retrieval commands. If not, no metadata computation is performed. If an idle period is identified (or, alternatively, if the analytics task was defined by the host as a high-priority task) processor 64 computes the metadata for the selected media object using AI inference engine 76, at a metadata computation operation 152. AI inference engine 76 computes the metadata using the AI model that was provided at operation 136 and compiled at operation 140.

At a database updating operation 156, processor 64 adds the metadata of the selected object to local metadata database 84. (In alternative embodiments the metadata database is not necessarily local. In an embodiment, processor 64 sends the metadata to a remote storage location, with the object data being stored locally at least temporarily.) The method then loops back to operation 144 above, for selecting the next media object for metadata computation.

The method flow of FIG. 3 is an example flow that is depicted solely for the sake of conceptual clarity. In alternative embodiments, any other suitable method can be used for combined object storage/retrieval and metadata computation by SSD controller 56.

The metadata in local databases 84 of the various SSDs 44 is accessible for use by hosts 24. In some embodiments, a host 24 reads the metadata, and possibly associated objects or parts thereof, from SSD 44. In an alternative embodiment, processor 64 of SSD controller 56 receives from a host 24 a request for certain metadata, and sends the requested metadata to the requesting host in response. In some embodiments, in addition to the requested metadata, processor 64 also sends to the requesting host one or more related media objects, or parts thereof. In other embodiments, processor 64 sends some or even all of the metadata to hosts 24 proactively, i.e., regardless of any request from the hosts. In an embodiment, a host 24 analyzes the metadata and requests selected segments of object media based on analysis of the metadata.

In some embodiments, an analysis task of a host 24 requires the use of metadata from multiple metadata databases 84 of different SSDs 44. In such embodiments, the host typically obtains the relevant metadata from the multiple SSDs, and consolidates the metadata as needed.

In some embodiments, the AI model and the objects for storage are received from the same host 24. In other embodiments, the AI model and the objects for storage are received from different hosts 24.

In some embodiments, processes 120 and 124 are carried out concurrently. In some embodiments, processor 64 gives higher priority to storage/retrieval of objects (process 120) than to metadata generation (process 124). As noted above, in some embodiments AI inference engine 76 generates the metadata during idle periods during which at least some resources of processor 64 are free from managing the storage/retrieval of objects. In an example embodiment, processor 64 identifies such idle periods in real time, and initiates or resumes metadata generation during the identified idle periods. Processor 64 suspends generation of metadata outside the identified idle periods. In an embodiment, while generation of metadata is suspended (outside the idle periods) processor 64 buffers unprocessed media objects in volatile memory until the associated metadata is generated.

Alternatively, processor 64 may use any other suitable prioritization scheme for giving precedence to storage/retrieval over metadata generation.

Figure 4:
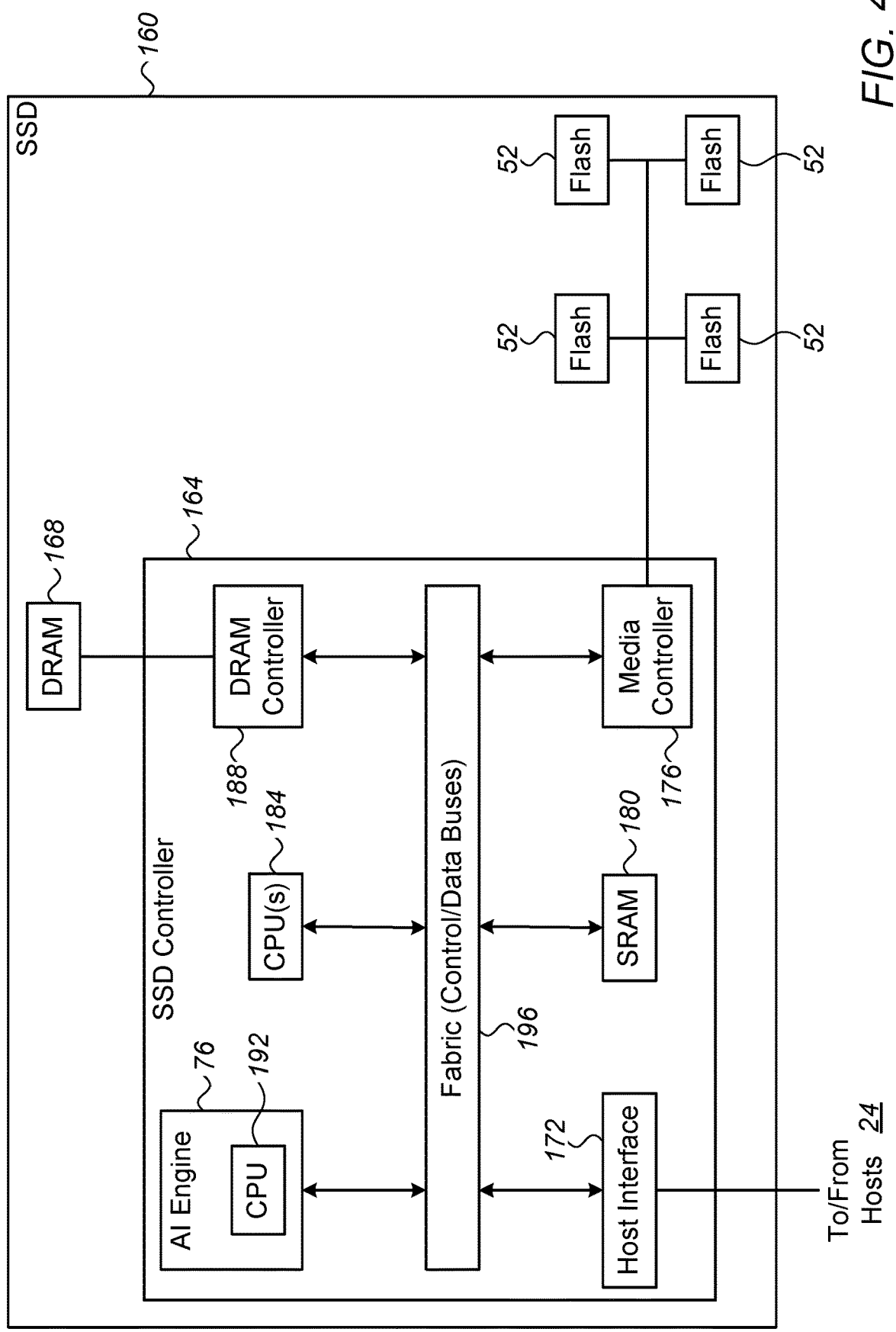
FIG. 4 is a block diagram that schematically illustrates an SSD, in accordance with an embodiment that is described herein.

FIG. 4 is a block diagram that schematically illustrates an SSD 160, in accordance with an alternative embodiment that is described herein. In the present example, SSD 160 comprises multiple Flash devices 52, e.g., NAND Flash memories, an SSD controller 164 and (optionally) a Dynamic RAM (DRAM) 168. SSD controller 164 comprises a host interface 172, a media controller 176, a Static RAM (SRAM) 180, one or more CPUs 184, a DRAM controller 188, and an AI inference engine 76 that optionally comprises a CPU 192.

Host interface 172 communicates with hosts 24, e.g., in accordance with the NVMe, SATA protocol or other suitable storage protocol. Media controller 176 is a processor that manages storage and retrieval of data in Flash devices 52, similarly to Flash management module 72 of FIGS. 1 and 2. DRAM controller 188 manages storage of data in DRAM 168. The various elements of SSD controller 164 communicate with one another via a fabric 196, which typically comprises suitable data and control buses.

Among other features, the example of FIG. 4 demonstrates that in some embodiments the SSD controller (or other storage device controller) comprises multiple processors that jointly perform data storage/retrieval (e.g., storage/retrieval of media objects) and metadata computation. The multiple processors may reside in one or more Integrated Circuits (ICs), packaged in a single package as a single device, or in multiple separate packages.

The system and storage device configurations depicted in FIGS. 1, 2 and 4 above are example configurations, which were chosen solely for the sake of conceptual clarity. FIGS. 1, 2 and 4 show example configurations in which a controller of a storage device (e.g., an SSD controller in an SSD) communicates over a computer network with one or more remote hosts, and locally with the NVM of the storage device. The controller comprises one or more processors that jointly perform a dual function: (i) management of local storage or retrieval of media objects in the NVM, and (ii) compute and store in the NVM metadata of media objects that are stored, or that are to be stored, in the NVM. In alternative embodiments, any other suitable system and/or storage-device configuration can be used. Elements that are not mandatory for understanding of the disclosed techniques have been omitted from the figures for the sake of clarity.

In alternative embodiments, the disclosed techniques can be used with other suitable types of storage devices, e.g., Hard Disk Drives (HDDs) in which the storage medium is magnetic.

The various elements of data processing systems 20 and 90, and of their components such as SSDs 44 and 114, as well as SSD 160 and its components, e.g., AI inference engine 76, may be implemented using dedicated hardware or firmware, such as using hard-wired or programmable logic, e.g., in an Application-Specific Integrated Circuit (ASICs) or Field-Programmable Gate Array (FPGA), using software, or using a combination of hardware and software elements.

Typically, processor 64 of SSD controller 56, CPU 184 and/or CPU 192 comprise programmable processors, which are programmed in software to carry out the functions described herein (e.g., Flash management and metadata computation). The software may be downloaded to the processor in electronic form, over a network, for example, or it may, alternatively or additionally, be provided and/or stored on non-transitory tangible media, such as magnetic, optical, or electronic memory.

Although the embodiments described herein mainly address media processing, the methods and systems described herein can also be used in other applications, such as in people behavior analytics.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A controller for use in a storage device of a data processing system, the controller comprising:
   a host interface configured to communicate over a computer network with one or more remote hosts of a data processing system;
   a memory interface, configured to communicate locally with a non-volatile memory of the storage device; and
   one or more processors, configured to:
      manage local storage or retrieval of media objects at the non-volatile memory;
      identify idle periods during which at least some resources of the one or more processors are free from managing storage of the objects; and
      during the idle periods, selectively compute metadata that defines content characteristics of media objects that are stored, or that are to be stored, in the non-volatile memory, wherein generation of the metadata is initiated or resumed during the identified idle periods, and suspended outside the identified idle periods.

2. The controller according to claim 1, wherein the one or more processors are configured to generate the metadata for a plurality of unstructured media objects that that are stored, or that are to be stored, in the non-volatile memory.

3. The controller according to claim 1, wherein the one or more processors are configured to receive from the one or more hosts, over the computer network, a model that specifies extraction of the metadata from the media objects, to generate the metadata based on the received model, and to store the generated metadata locally in the non-volatile memory, for use by the one or more hosts.

4. The controller according to claim 3, wherein the one or more processors are configured to receive, as the model, a pre-trained Artificial Intelligence (AI) model, to compile the AI model to run on an AI inference engine running in the one or more processors, and to generate the metadata by applying the AI inference engine to the compiled AI model.

5. The controller according to claim 1, wherein the one or more processors are configured to assign a first priority to management of the storage or retrieval of the objects at the non-volatile memory, and to assign a second priority, lower than the first priority, to generation of the metadata.

6. The controller according to claim 1, wherein the one or more processors are configured to make the metadata accessible to the one or more hosts, the one or more hosts being situated at a location that is remote from the processor, over the computer network.

7. The controller according to claim 6, wherein the one or more processors are configured to make the metadata accessible by transmitting the metadata, but less than all of the media objects from which the metadata was generated, over the computer network.

8. The controller according to claim 7, wherein, subsequently to sending the metadata, the one or more processors are configured to send one or more of the media objects over the computer network in response to a request from one or more of the hosts.

9. The controller according to claim 1, wherein the storage device comprises a Solid State Drive (SSD), and wherein the non-volatile memory comprises one or more Flash memory devices.

10. The controller according to claim 1, wherein the storage device comprises a Hard Disk Drive (HDD), and wherein the non-volatile memory comprises one or more magnetic disks.

11. The controller according to claim 1, wherein the one or more processors comprise a single processor that is configured both to manage the local storage or retrieval of the media objects and to compute the metadata.

12. The controller according to claim 1, wherein, in computing the metadata, the one or more processors are configured to tag one or more events of interest in the media objects.

13. A method for generating metadata that defines content characteristics of media objects, comprising:
by a host interface coupled to a storage device situated in a data processing center, communicating over a computer network with one or more remote hosts of the data processing center;
by a memory interface of the storage device, communicating locally with a non-volatile memory of the storage device;
managing, by one or more processors of storage device, local storage or retrieval of media objects at the non-volatile memory;
identifying, by the one or more processors, idle periods during which at least some resources of the one or more processors are free from managing storage of the objects; and
during the idle periods, selectively computing, by the one or more processors of the storage device, metadata that defines content characteristics of media objects that are stored, or that are to be stored, in the non-volatile memory, including initiating or resuming generation of the metadata during the identified idle periods, and suspending the generation of the metadata outside the identified idle periods.

14. The method according to claim 13, wherein computing the metadata comprises generating the metadata for a plurality of unstructured media objects that that are stored, or that are to be stored, in the non-volatile memory.

15. The method according to claim 13, wherein computing the metadata comprises receiving from the one or more hosts, over the computer network, a model that specifies extraction of the metadata from the media objects, generating the metadata based on the received model, and storing the generated metadata locally in the non-volatile memory, for use by the one or more hosts.

16. The method according to claim 15, wherein receiving the model comprises receiving a pre-trained Artificial Intelligence (AI) model, and wherein computing the metadata comprises compiling the AI model to run on an AI inference engine running in the one or more processors, and generating the metadata by applying the AI inference engine to the compiled AI model.

17. The method according to claim 13, comprising assigning a first priority to management of the storage or retrieval of the objects at the non-volatile memory, and assigning a second priority, lower than the first priority, to generation of the metadata.

18. The method according to claim 13, comprising making the metadata accessible to the one or more hosts, the one or more hosts being situated at a location that is remote from the one or more processors, over the computer network.

19. The method according to claim 18, wherein making the metadata accessible comprises transmitting the metadata, but less than all of the media objects from which the metadata was generated, over the computer network.

20. The method according to claim 19, comprising, subsequently to sending the metadata, sending one or more of the media objects over the computer network in response to a request from one or more of the hosts.

21. The method according to claim 13, wherein the storage device comprises a Solid State Drive (SSD), and wherein the non-volatile memory comprises one or more Flash memory devices.

22. The method according to claim 13, wherein the storage device comprises a Hard Disk Drive (HDD), and wherein the non-volatile memory comprises one or more magnetic disks.

23. The method according to claim 13, wherein managing the local storage or retrieval of the media objects, and computing the metadata, are both performed by a single processor of the storage device.

24. The method according to claim 13, wherein computing the metadata comprises tagging one or more events of interest in the media objects.

25. A controller for use in a storage device of a data processing system, the controller comprising:
a host interface configured to communicate over a computer network with one or more remote hosts of a data processing system;
a memory interface, configured to communicate locally with a non-volatile memory of the storage device; and
one or more processors, configured to:
manage local storage or retrieval of media objects at the non-volatile memory;
receive from the one or more hosts, over the computer network, a pre-trained Artificial Intelligence (AI) model that specifies metadata extraction from the media objects;
selectively compute metadata that defines content characteristics of media objects that are stored, or that are to be stored, in the non-volatile memory, by applying an AI inference engine to the AI model; and
store the generated metadata locally in the non-volatile memory, for use by the one or more hosts.

26. The controller according to claim 25, wherein the one or more processors are configured to compile the AI model to run on the AI inference engine running in the one or more processors, and to generate the metadata by applying the AI inference engine to the compiled AI model.

27. A method for generating metadata that defines content characteristics of media objects, comprising:
by a host interface coupled to a storage device situated in a data processing center, communicating over a computer network with one or more remote hosts of the data processing center;

by a memory interface of the storage device, communicating locally with a non-volatile memory of the storage device;

managing, by one or more processors of the storage device, local storage or retrieval of media objects at the non-volatile memory;

receiving from the one or more hosts, over the computer network, a pre-trained Artificial Intelligence (AI) model that specifies metadata extraction from the media objects;

selectively computing, by the one or more processors of the storage device, metadata that defines content characteristics of media objects that are stored, or that are to be stored, in the non-volatile memory, by applying an AI inference engine to the AI model; and storing the generated metadata locally in the non-volatile memory, for use by the one or more hosts.

28. The method according to claim 27, wherein computing the metadata comprises compiling the AI model to run on the AI inference engine running in the one or more processors, and generating the metadata by applying the AI inference engine to the compiled AI model.

\* \* \* \* \*